Oct. 13, 1925.
J. A. BURCHAM
1,557,019
COMBINATION SEED DISPENSER
Filed Nov. 3, 1923      2 Sheets-Sheet 1
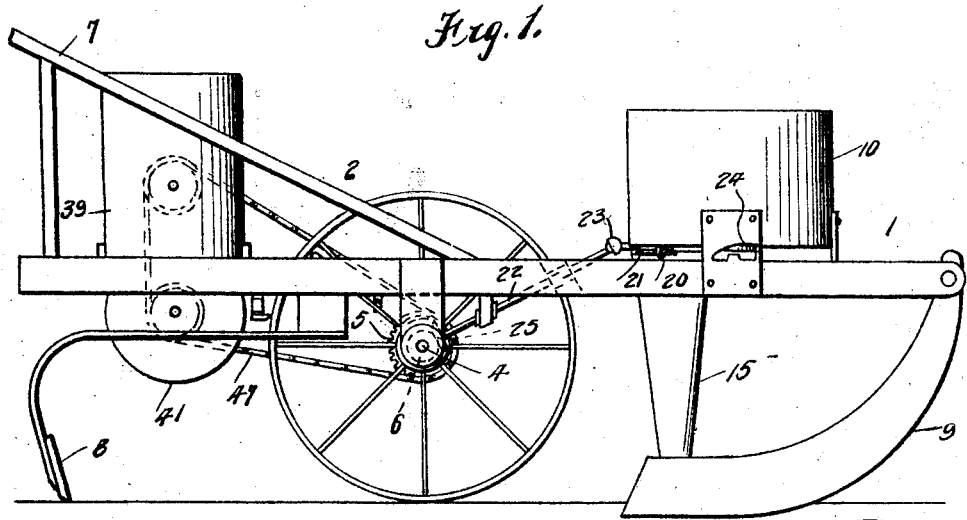
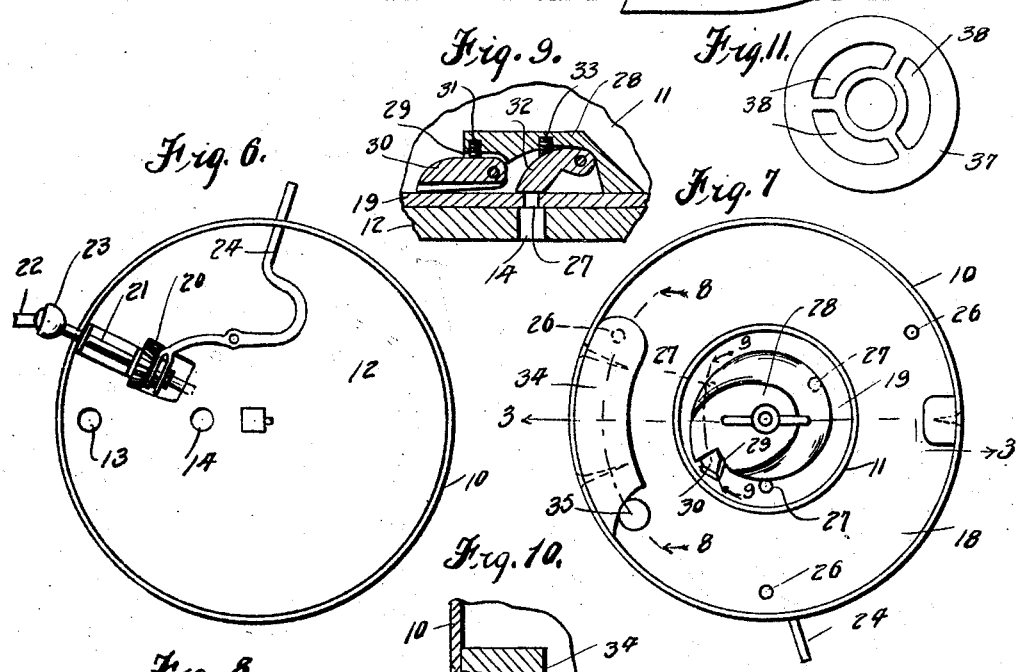

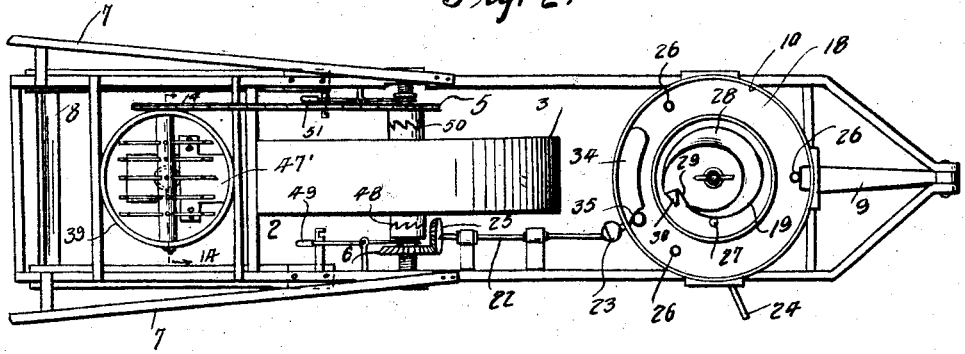
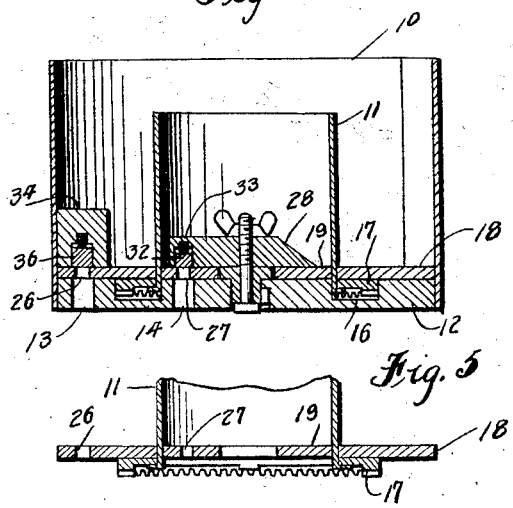
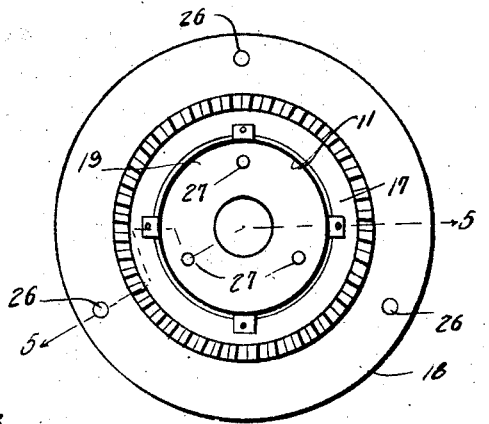

Patented Oct. 13, 1925.

1,557,019

UNITED STATES PATENT OFFICE.

JOHN A. BURCHAM, OF BATH SPRINGS, TENNESSEE.

COMBINATION SEED DISPENSER.

Application filed November 3, 1923. Serial No. 672,550.

*To all whom it may concern:*

Be it known that I, JOHN A. BURCHAM, a citizen of the United States, residing at Bath Springs, in the county of Decatur and State of Tennessee, have invented certain new and useful Improvements in a Combination Seed Dispenser; and I do hereby declare the following to be a full, clear, and exact description of the invention, such as will enable others skilled in the art to which it appertains to make and use the same.

The invention has relation to an agricultural implement for planting seeds and has for its object to provide an implement adapted for planting simultaneously two different kinds of seed such for instance as corn and peas.

A further object of the invention is the provision of means whereby the quantity of seed deposited in a hill may be regulated and furthermore to insure a positive discharge of the predetermined amount of seed to be delivered.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application.

Figure 1 is a side view of a combined planter and fertilizer distributor embodying the invention, Figure 2 is a top plan view thereof, Figure 3 is a sectional detail view of the forward hopper and distributing mechanism associated therewith on the line 3—3 of Figure 7, Figure 4 is a view of the part shown in Figure 3 as seen from the bottom side, the bottom plate being omitted, Figure 5 is a detail sectional view on the line 5—5 of Figure 4, the upper portion of the inner hopper being broken away, Figure 6 is a view of the forward hopper inverted showing more clearly the means for throwing the distributing mechanism into and out of gear, Figure 7 is a top plan view of the forward hopper and parts associated therewith on a larger scale, Figure 8 is a detail sectional view on the line 8—8 of Figure 7, Figure 9 is an enlarged detail sectional view on the line 9—9 of Figure 7.

Figure 10 is a detail sectional view on the line 10—10 of Figure 8, and

Figure 11 is a plan view of the fertilizer distributing plate.

Corresponding and like parts are referred to in the following description and designated in the several views of the drawings by like reference characters.

The implement comprises a runner frame 1 and a wheel frame 2 which may be of any usual or preferred construction and arrangement, each of the frames being provided with a distributing mechanism. The ground wheel 3 is fast to an axle 4 upon which is mounted a sprocket wheel 5 and a beveled gear wheel 6. Handle bars 7 are provided for manipulating the implement in a manner well understood. The usual covering blade 8 is located at each side of the implement for covering the seed which is deposited in the furrow or trench formed by the runner 9 in a manner well understood.

The mechanism for planting seed such as corn and peas and for distributing fertilizer is mounted upon the runner frame or forward portion of the implement and comprises an outer hopper 10 which is fixed and an inner hopper 11 concentric with the outer hopper and mounted to rotate. A plate 12 closes the bottom of the hopper 10 and is stationary. The plate 12 is formed with two openings 13 and 14 which are comprised within the upper end of a spout or tube 15 which conveys the seed or seed and fertilizer to the trench or furrow formed by the runner 9. An annular recess 16 is formed in the top side of the plate 12 and receives a toothed ring 17 which is brazed or otherwise attached to the lower end of the inner hopper 11. Distributing plates 18 and 19 are supported upon the bottom plate 12, are brazed or otherwise fastened to hopper 11 and the latter to ring 17, and are rotatable with the hopper 11. The toothed ring 17 is attached to the bottom side of the plate 18 and is in mesh with a bevel gear 20 splined to a shaft 21 which is connected at its outer end to a longitudinal shaft 22 by means of a universal joint 23. A lever 24 pivoted intermediate its ends to the bottom plate 12 is in engagement with the bevel gear 20 and provides convenient means for moving said bevel gear into and out of engagement with the toothed ring 17 whereby to throw the forward distributing mechanism into or out of gear as required. The shaft 22 is provided at its lower rear end with a beveled gear 25 which is in mesh with the beveled gear 6 whereby to derive movement from the shaft or axle 4. The distributing plate 18 is provided with a plurality of openings 26 which are adapted to register with the opening 13 of the bottom plate 12. The distributing plate 19 is formed with a plurality of openings 27 which are adapted to register with the opening 14 of the plate 12. A fixed guard 28 is disposed about the plate 19 and an edge portion is beveled and arranged to cover the openings 27. An edge portion of the guard 28 is cut away as indicated at 29 to admit of the openings 27 being successively exposed so as to receive seed or fertilizer from the hopper 11. A block 30 is pivoted at its inner end to the guard 28 and is yieldably pressed upon the plate 19 by means of a spring 31 and the block 30 operates to remove any superfluous seed from the openings 27 of the plate 19. An ejector 32 is pivoted at one end to the guard 28 and its opposite end is pressed upon the plate 19 by means of a spring 33 and this ejector serves to effect positive delivery of the seed from the openings 27 of the plate 19.

A guard 34 is disposed above the plate 18 and is attached to the inner wall of the hopper 10 and is provided at one end with a brush 35 for removing superfluous seed from the openings 26 of the plate 18 and with a pivoted spring actuated ejector 36 similar in construction and operation to the ejector 32.

A plate 37—Figure 11—is provided to be substituted for the plate 19 when it is desired to distribute fertilizer. The plate 37 is formed with a plurality of openings 38 of such construction and arrangement as to admit of a continuous discharge of the fertilizer. The space between the two hoppers 10 and 11 is of annular form and is intended to receive corn whereas the space comprised within the hopper 11 is designed to receive other seed. Both peas and corn may be distributed or planted at the same time but in alternation, so that the peas come between the hills of corn.

The hopper 39 shown at the rear of the implement is intended for sowing cotton or other seed, but is not a part of the invention involved by the claims of this patent, and will not be described in detail.

Having thus described the invention, what I claim is:—

1. In a planter, concentric hoppers, the outer hopper being stationary, a bottom plate common to both hoppers and closing the lower ends thereof and having a discharge opening for each hopper, and rotatable dispensing plates for the respective hoppers mounted upon said bottom plate, said dispensing plates and inner hopper being rigidly connected together.

2. In a planter, an outer stationary hopper, an inner hopper, a bottom plate common to both hoppers and having a discharge opening for each and provided in its top side with an annular recess, dispensing plates rotatably mounted upon the bottom plate rigid with each other and with the inner hopper, a toothed ring disposed in the annular recess of the bottom plate and having rigid connection with the inner hopper and dispensing plate.

3. In a planter, an outer stationary hopper and an inner hopper, a bottom plate common to both hoppers and having a discharge opening for each and provided in its top side with an annular recess, dispensing plates rotatably mounted upon the bottom plate rigid with each other and with the inner hopper, a toothed ring disposed in the annular recess of the bottom plate and having rigid connection with the inner hopper and dispensing plate, a shaft mounted upon said bottom plate, a gear wheel splined to said shaft and adapted to mesh with said toothed ring and a lever mounted upon the bottom plate and adapted to move said gear wheel into and out of engagement with the toothed ring.

In testimony whereof I affix my signature.

JOHN A. BURCHAM.